US007204457B2

(12) United States Patent
Ackerman et al.

(10) Patent No.: US 7,204,457 B2
(45) Date of Patent: Apr. 17, 2007

(54) BARRIER NET

(75) Inventors: David Ackerman, Dorchester (GB); Stephen Mark Trafford, Lyme Regis (GB); John William Startup, Crewkerne (GB)

(73) Assignee: Amsafe Bridport Limited, Dorset (GB)

( * ) Notice: Subject to any disclaimer, the term of this patent is extended or adjusted under 35 U.S.C. 154(b) by 90 days.

(21) Appl. No.: 10/501,437

(22) PCT Filed: Jan. 23, 2003

(86) PCT No.: PCT/GB03/00220

§ 371 (c)(1), (2), (4) Date: Jul. 13, 2004

(87) PCT Pub. No.: WO03/062054

PCT Pub. Date: Jul. 31, 2003

(65) Prior Publication Data
US 2005/0072877 A1  Apr. 7, 2005

(30) Foreign Application Priority Data
Jan. 25, 2002  (GB) ................ 0201752.3

(51) Int. Cl.
B64C 1/20 (2006.01)
(52) U.S. Cl. ................ 244/118.1; 244/137.1
(58) Field of Classification Search ............ 244/118.1, 244/110 R, 110 C, 118.5, 137.1, 136
See application file for complete search history.

(56) References Cited

U.S. PATENT DOCUMENTS

| 2,669,402 | A |   | 2/1954 | Del Mar |
|---|---|---|---|---|
| 3,011,820 | A | * | 12/1961 | Frieder et al. ............ 294/77 |
| 3,486,723 | A | * | 12/1969 | Harrison ............ 410/118 |
| 3,961,585 | A | * | 6/1976 | Brewer ............ 410/97 |
| 4,270,657 | A |   | 6/1981 | Bayon |
| 5,121,958 | A | * | 6/1992 | Goeden et al. ............ 296/37.1 |
| 5,540,402 | A | * | 7/1996 | Carducci ............ 244/118.1 |
| 5,915,652 | A | * | 6/1999 | Caldwell et al. ............ 244/121 |
| 6,123,294 | A | * | 9/2000 | Genovese ............ 244/110 C |

(Continued)

FOREIGN PATENT DOCUMENTS

DE   1580269 A   1/1971

(Continued)

OTHER PUBLICATIONS

European Patent Office International Search Report for International Application No. PCT/GB03/00220 dated Apr. 25, 2003.

(Continued)

*Primary Examiner*—Timothy D. Collins
(74) *Attorney, Agent, or Firm*—Vedder, Price, Kaufman & Kammholz P.C.

(57) ABSTRACT

A barrier net (12) across a space defined by the fuselage (6) of an aircraft and a floor (7) of the aircraft comprising a first plurality of parallel lengths (13) orientated in a first direction transverse to a second plurality of parallel lengths (14) orientated in a second direction wherein the lengths (13, 14) have fastening means at each end which provide a means for fastening the net to attachment points on the aircraft fuselage (6), characterised in that neither the first nor the second plurality of lengths (13, 14) is parallel to said floor (7).

18 Claims, 2 Drawing Sheets

U.S. PATENT DOCUMENTS 6,244,803 B1    6/2001   Parish et al.
6,637,991 B2 *  10/2003  Looker et al. ................ 410/97

FOREIGN PATENT DOCUMENTS

DE           7837364 U    5/1980

GB           1038767 A    8/1966

OTHER PUBLICATIONS

European Patent Office International Preliminary Examination Report for International Application No. PCT/GB03/00220 dated May 4, 2004.

* cited by examiner

BARRIER NET

The present invention relates to a barrier net across a space defined by the fuselage of an aircraft and a floor of the aircraft, for example for restraining the movement of cargo in the fuselage of an aircraft.

It is well known to use nets to restrain the movement of cargo in the holds of aircraft. Traditionally, such nets comprise a network of webbing members lined up vertically and horizontally and stitched together into a rectangular grid pattern, or lined up radially and circumferentially about a central torus and stitched together in a "spider-web" pattern.

Such nets are conventionally fitted with fastening means at each end of the webbing members which are attached to attachment points provided spaced around the fuselage and floor of the aircraft. These fastening means are typically in the form of shackles.

Such known nets suffer from a number of disadvantages. Both of these construction patterns, or net geometries, are deficient in terms of their ability to allow a net to be designed that imparts near equal loads on all its attachments. This can lead to excessively high loads being imposed on certain attachments and the need for local reinforcing of the aircraft structure, or conversely, it leads to a complex and expensive net. For example, in the case of a conventional rectangular grid net, the majority of the load is directed horizontally and vertically and only a relatively small portion of the load is imparted in the diagonal directions. This results in an excessively large load being imparted on certain attachments.

It is an object of the present invention to go at least some way to overcoming the above disadvantages, or at least to provide an acceptable alternative system for restraining cargo in the fuselage of an aircraft.

According to the present invention, there is provided a barrier net across a space defined by the fuselage of an aircraft and a floor of the aircraft comprising a first plurality of parallel lengths orientated in a first direction transverse to a second plurality of parallel lengths orientated in a second direction wherein neither the first nor the second plurality of lengths is parallel to said floor.

It is preferred that the first plurality of lengths are transverse to the second plurality of lengths at substantially right angles and in addition to this it is more preferred that the first plurality of lengths are orientated at substantially 45 E relative to the floor. When this is the case the net mesh will be substantially diamond in shape. The diamond shape is better able to share the load than a conventional rectangular mesh net.

The lengths are preferably secured by securing means at the regions at which they cross. These means may take a variety of forms but it is most preferred that the lengths are secured by stitching or are intersected at the regions at which they cross. These intersections may be in the form of knots or may be knotless intersections.

In order that the net may act as a barrier across an internal space in an aircraft it is preferable that each of the lengths are provided with fastening means at each end which may be attached to attachment points on the aircraft fuselage and floor. The fastening means preferably comprise shackles and in a particularly advantageous form at least some of the fastening means may comprise quick release fastenings.

It is preferred that at least one of the first plurality of lengths is attached to the same attachment point on the aircraft as at least one of the second plurality of lengths.

The first plurality of lengths may preferably be constructed from lengths of textile webbing, rope, plastics fibre material or metallic fibre cables or a combination thereof.

The second plurality of lengths may preferably be constructed from lengths of textile webbing, rope, plastics fibre material or metallic fibre cables or a combination thereof.

For a better understanding of the invention, reference will now be made to the accompanying drawings showing, solely by way of example one embodiment of the present invention, in which.

In the three different net designs like or equivalent parts are referenced with the same reference numbers.

Figure 1:
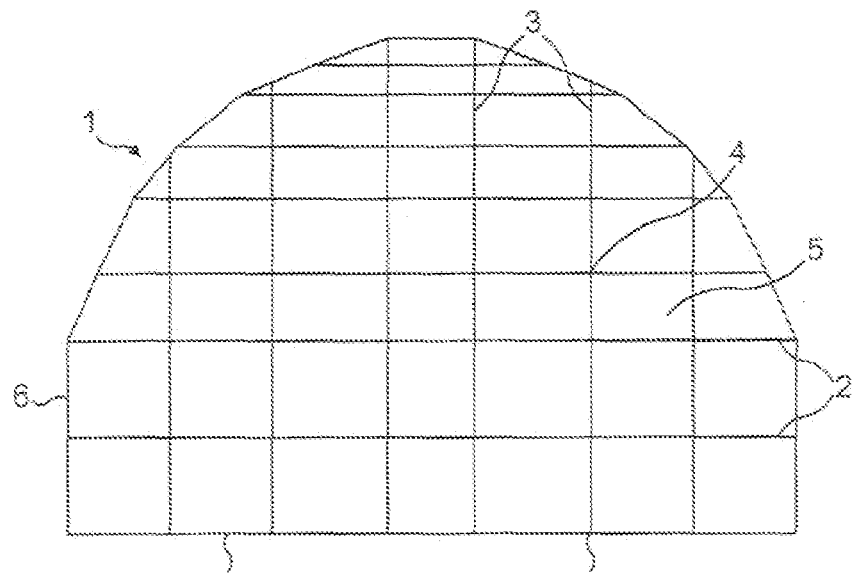
FIG. 1 is a front view of a conventional net design with horizontal and vertical webbing members.

Referring to FIG. 1, this conventional cargo net 1 comprises a plurality of horizontal webbing members 2 and a plurality of vertical webbing members 3 secured at the regions at which they cross 4. In this case the webbing members 2, 3 are stitched together at the regions in which they cross 4 but other methods may be used. A net 1 such as this may be considered to have a rectangular grid pattern since the horizontal and vertical webbing members define a rectangular pattern 5. When a cargo net 1 such as this is employed across a space defined by the fuselage 6 of an aircraft and the floor 7 of the aircraft fastening devices (not shown) are used to attach the net to attachment points 16 provided on the fuselage 6 and floor 7 of the aircraft. These fastening devices may typically be shackles.

It has been found that this net geometry does not distribute the load efficiently with the result that excessively high loads are imparted to some attachment points.

Figure 2:
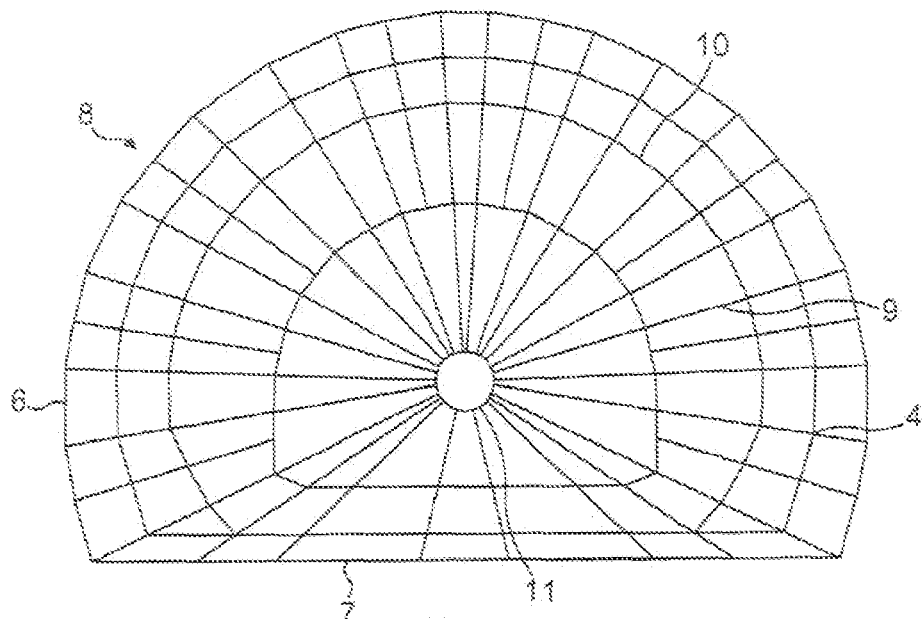
FIG. 2 is a front view of a conventional "spider-web" net design.

FIG. 2 shows another conventional design for cargo barrier nets 8 to be installed across the space defined by the fuselage 6 of an aircraft and the floor 7 of an aircraft. In this design the webbing members are arranged radially 9 and circumferentially 10 about a central torus 11. As with the rectangular grid net of FIG. 1 the webbing members are secured at the regions at which they cross 4, typically by stitching and fastening devices (not shown) are used to attach the net to the aircraft. As with the net of FIG. 1 it has been found that this net does not distribute the load efficiently. Another disadvantage of this type of net is the additional weight incurred in the torus and the circumferential webbing members.

Figure 3:
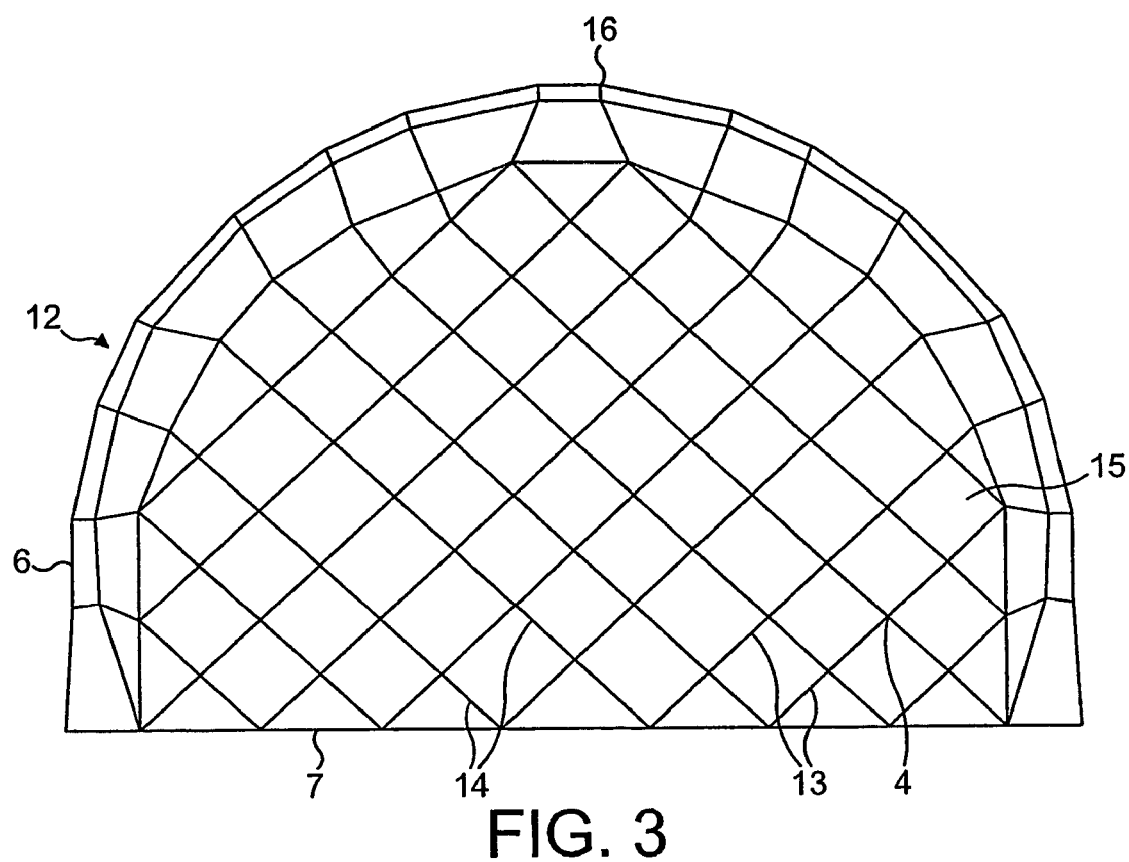
FIG. 3 is a front view of one embodiment of a main deck cargo barrier net according to the present invention.

FIG. 3 shows an embodiment of a cargo barrier net 12 according to the present invention installed across an internal space defined by the fuselage 6 of an aircraft and the floor 7 of an aircraft. The net 12 has a first plurality of parallel lengths 13 orientated at approximately 45 E relative to the floor 7 and a second plurality of parallel lengths 14 transverse to the first at substantially right angles.

The lengths may be constructed of conventional textile webbing or may be made from other materials known in the art such as a variety of plastics fibre materials or metallic fibre cables. The lengths are secured by stitching at the regions at which they cross 4. When the net is viewed from the front the first and second lengths 13, 14 define a diamond grid pattern 15. This is one of the factors which accounts for the improved function of the net. The diamond shape is able to stretch along its diagonals in the horizontal and vertical directions thus enabling the net to better distribute the load. Not only does this provide a more even distribution of the load but it also results in a smoother deflected profile.

Each of the first and second lengths have fastening means (not shown) at each end which provide a means for fastening the net to attachment points 16 on the fuselage 6 and floor 7 of the aircraft. Some of the attachment points provide a means for fastening more than one length.

It has been found that this net geometry allows more efficient load distribution. This may be because the first and second lengths 13, 14 run diagonally across the fuselage of the aircraft. This means that the load is distributed out towards attachment points which would receive only a small portion of the load in a conventional configuration. In combination with the nets ability to stretch along the diagonals of the diamond this may account for the much more even distribution of the load.

The invention claimed is:

1. A barrier net across a space defined by the fuselage of an aircraft and a floor of the aircraft comprising a first plurality of parallel lengths orientated in a first direction transverse to a second plurality of parallel lengths orientated in a second direction wherein each of the lengths have a separate fastening means at each end which provide a means for fastening the net to attachment points on the aircraft fuselage, and wherein neither the first nor the second plurality of lengths is parallel to said floor.

2. A barrier net according to claim 1, wherein the first plurality of lengths are transverse to the second plurality of lengths at substantially right angles.

3. A barrier net according to claim 1, wherein the first plurality of lengths are orientated at an angle of 45 E relative to said floor.

4. A baffler net according to claim 1, wherein the lengths are secured by securing means at the regions at which they cross.

5. A baffler according to claim 4, wherein the securing means comprises stitching at the regions at which the lengths cross.

6. A baffler net according to claim 4, wherein the securing means comprises knots at the regions at which the lengths cross.

7. A baffler net according to claim 4, wherein the securing means comprises knotless intersections at the regions at which the lengths cross.

8. A barrier net according to claim 1, wherein the fastening means comprise shackles.

9. A barrier net according to claim 1, wherein at least some of the fastening means comprise quick release fastenings.

10. A barrier net according to claim 1, wherein at least one of the first plurality of lengths is attached to the same attachment point in the aircraft as one of the second plurality of lengths.

11. A barrier net according to claim 1, wherein at least some of the first plurality of lengths comprise lengths of textile webbing.

12. A barrier net according to claim 1, wherein at least some of the first plurality of lengths comprise lengths of rope.

13. A barrier net according to claim 1, wherein at least some of the first plurality of lengths comprise lengths of plastics fibre material.

14. A barrier net according to claim 1, wherein at least some of the first plurality of lengths comprise lengths of metallic fibre cables.

15. A baffler net according to claim 1, wherein at least some of the second plurality of lengths comprise lengths of textile webbing.

16. A baffler net according to claim 1, wherein at least some of the second plurality of lengths comprise lengths of rope.

17. A baffler net according to claim 1, wherein at least some of the second plurality of lengths comprise lengths of plastics fibre material.

18. A barrier net according to claim 1, wherein at least some of the second plurality of lengths comprise lengths of metallic fibre cables.

* * * * *